United States Patent
Garcia et al.

(10) Patent No.: US 12,072,224 B2
(45) Date of Patent: Aug. 27, 2024

(54) FIELD DEVICE WITH OPERABLE LUMINOUS DISPLAY

(71) Applicant: VEGA Grieshaber KG, Wolfach (DE)

(72) Inventors: Juan Garcia, Biberach (DE); Ralf Hoell, Titisee-Neustadt (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 18/160,038

(22) Filed: Jan. 26, 2023

(65) Prior Publication Data
US 2023/0243687 A1  Aug. 3, 2023

(30) Foreign Application Priority Data
Jan. 31, 2022 (DE) .................... 10 2022 201 008.6

(51) Int. Cl.
| G01D 11/24 | (2006.01) |
| G01D 11/28 | (2006.01) |
| G01F 23/284 | (2006.01) |
| G01S 13/88 | (2006.01) |

(52) U.S. Cl.
CPC ......... *G01F 23/2845* (2013.01); *G01D 11/24* (2013.01); *G01D 11/28* (2013.01); *G01S 13/88* (2013.01); *G01D 2207/30* (2021.05)

(58) Field of Classification Search
CPC ................................ G01D 11/28; G01D 11/24
See application file for complete search history.

(56) References Cited

U.S. PATENT DOCUMENTS

| 2021/0333780 A1* | 10/2021 | Shah | .................. G05B 19/4155 |
| 2021/0356302 A1* | 11/2021 | Welle | .................. G01D 11/245 |

FOREIGN PATENT DOCUMENTS

| DE | 20 2008 012 757 U1 | | 2/2009 | |
| DE | 202008012757 U1 | * | 2/2009 | ........... G01D 11/245 |
| DE | 10 2008 037 194 A1 | | 2/2010 | |
| DE | 10 2020 125 103 A1 | | 3/2022 | |
| EP | 3 312 895 A1 | | 4/2018 | |
| EP | 3312895 A1 | * | 4/2018 | ........... C07D 221/18 |
| EP | 3 910 298 A1 | | 11/2021 | |
| EP | 3910298 A1 | * | 11/2021 | ........... G01D 11/245 |
| WO | WO-2004017026 A1 | * | 2/2004 | ............ G01D 11/24 |
| WO | WO 2020/083567 A1 | | 4/2020 | |
| WO | WO-2020083567 A1 | * | 4/2020 | ......... G05B 19/4155 |

OTHER PUBLICATIONS

Office Action issued Aug. 17, 2022, in corresponding Germany Patent Application No. 10 2022 201 008.6, 9 pages.

* cited by examiner

*Primary Examiner* — Jamel E Williams
(74) *Attorney, Agent, or Firm* — Oblon, McClelland, Maier & Neustadt, L.L.P.

(57) ABSTRACT

Field device for process automation in industrial or private environments, which has an operating element with a button and a luminous display, the luminous display being set up for optical feedback of the operating command issued by a user to the button.

19 Claims, 3 Drawing Sheets

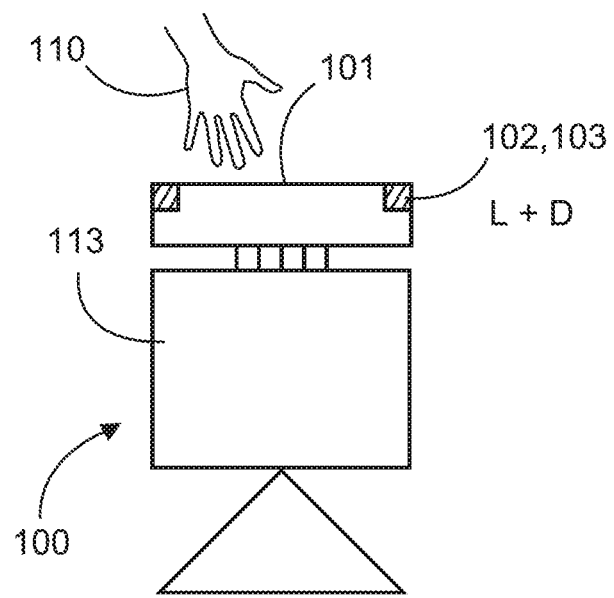
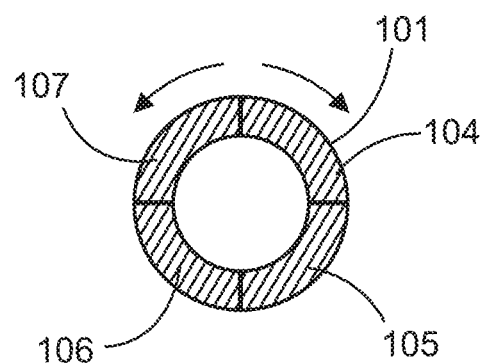
Fig. 3a
Fig. 3b
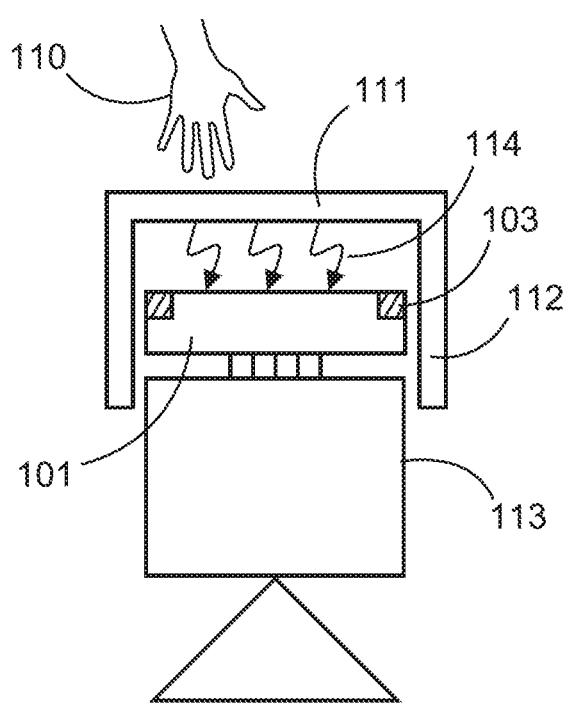
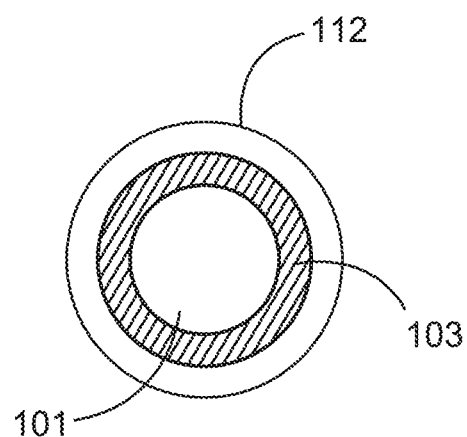
Fig. 4a
Fig. 4b

FIELD DEVICE WITH OPERABLE LUMINOUS DISPLAY

CROSS-REFERENCE TO RELATED APPLICATIONS

This application claims the benefit of the filing date of German Patent Application No. 10 2022 201 008.6 filed on 31 Jan. 2022, the entire content of which is incorporated herein by reference.

TECHNICAL FIELD

The present disclosure relates to field devices for process and factory automation in industrial or private environments. In particular, the present disclosure relates to a field device with an illuminated display that can be operated.

TECHNICAL BACKGROUND

Field devices, which are configured for process and factory automation in industrial or private environments, are used to determine process parameters or to detect objects (level detection). Such field devices are, for example, level meters, pressure meters, flow meters, level sensors or microwave barriers.

Operating keys and a display for visualizing measured values or diagnostic information can be integrated in the field device for operating the field devices. Strong light irradiation or soiling can make operation and readability difficult, so that input errors can occur.

SUMMARY

With this in mind, there may be a desire to facilitate the operability of field devices.

A first aspect of the present disclosure relates to a field device that is configured for process automation in an industrial or private environment. It comprises a control element configured to operate the field device. The operating element comprises, in combination, a button, i.e., a key, and a luminous display, i.e., an illuminated indicator. The luminous display is configured for optical feedback of an operating command issued by a user to the button. The optical feedback is in particular a large-area light signal emitted by a large-area light source. In particular, the luminous display can be configured to emit optical feedback in different colors, for example red, yellow and green, or white or blue. Also, the luminous display may be arranged to emit the luminous signals permanently or in a kind of "flashing mode", i.e., alternately "on" and "off". Color and flashing frequency can convey valuable information to the user, and without the need to read writing on a display.

According to one embodiment, the key can be rotated and/or moved laterally. Alternatively or additionally, it can also be pressed. In this way, various operating commands issued by the user to the key can be converted into corresponding operating signals. In this way, a wide variety of operating commands can be entered by a single button, and this without the user having to read the information written on a display or the button. The optical feedback in the form of a light signal or several light signals, which can still be perceived at a rather unfavorable viewing angle, further simplifies operation. This is particularly advantageous in difficult installation conditions, lighting conditions or poor eyesight.

According to a further embodiment, the button has a capacitive or magnetic sensor system for converting an operating command issued by the user to the button into a corresponding operating signal. In particular, it may be provided that the operation of the button is contactless.

In the latter case, a field device cover can be used, which is attached to the field device housing and covers the operating element. This allows the operating element to be protected from environmental influences or hazardous areas, which may be particularly advantageous for outdoor use.

According to another embodiment, the light indicator is integrated into the key.

According to a further embodiment, the key is divided into several tactile segments, for example two, three or four segments. It may be provided that the different segments can be illuminated in different colors, which further facilitates input. Different colors can be assigned to different operating commands. For example, the color green can be used for acknowledgement, etc.

According to another embodiment of the present disclosure, the operating element is designed as a removable, retrofittable module that can be plugged onto the housing of the field device. Electrical interfaces are provided for this purpose. It may also be provided that the operating element is connected by a rotary movement, for example in combination with a type of bayonet catch.

According to an embodiment, the field device has no further operating element. Rather, it can be operated and parameterized exclusively by the operating element described above.

According to another embodiment, the field device is a level sensor, in particular a level radar sensor that takes transit time measurements, a point level sensor, a flow meter, or a microwave barrier, in particular a reflective microwave barrier.

In the following, embodiments of the present disclosure are described with reference to the figures. If the same reference signs are used in the description of the figures, these designate the same or similar elements. The illustrations in the figures are schematic and not to scale.

BRIEF DESCRIPTION OF THE FIGURES

FIG. 2a shows a field device with a control element attached thereto.

FIG. 2b shows a top view of the control element of FIG. 2a.

FIG. 2c shows a top view of another embodiment of the control element of the field device of FIG. 2a.

FIG. 3a shows a field device according to a further embodiment.

FIG. 3b shows a top view of the control element of the field device of FIG. 3a.

FIG. 4a shows another field device according to one embodiment.

FIG. 4b shows a top view of the control element of the field device of FIG. 4a.

FIG. 5b shows a top view of the control element of the field device of FIG. 5a.

DETAILED DESCRIPTION OF EMBODIMENTS

Figure 1:
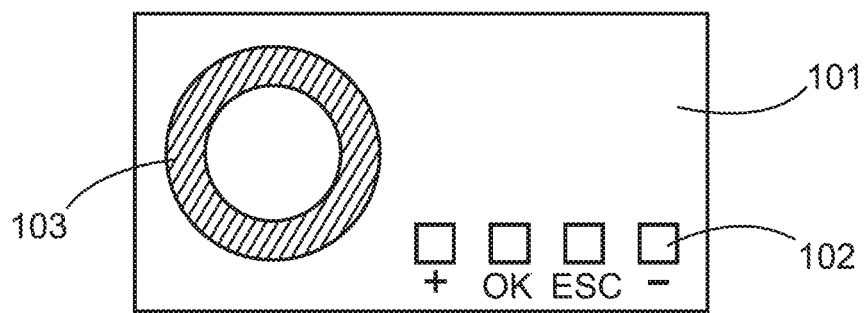
FIG. 1 shows a control element of a field device in top view.

FIG. 1 shows a control element 101 configured to operate a field device. The operating element 101 has, for example, a plurality of keys 102 which are labeled. In addition, a luminous display 103 is provided next to the keys, which is, for example, designed in a ring shape here. The illuminated display 103 may be a display with one or more light emitting diodes ("LEDs"). The operating area has four keys 102, which are labeled "plus", "okay", "esc" and "minus".

Figures 2A, 2B, 2C:
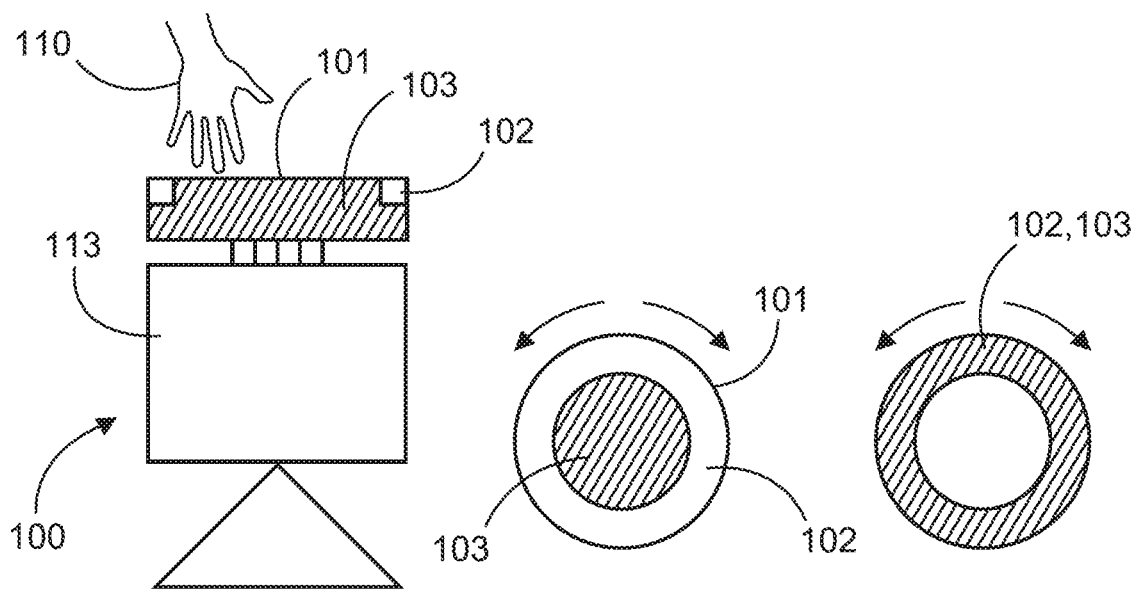

FIG. 2a shows a field device 100, here in the form of a level radar with a horn antenna. An operating or control element 101 is plugged onto the field device housing. The operating element 101 is of modular design and can be plugged on subsequently. In particular, it may be provided that it is used for retrofitting the field device.

The control element 101 may also be referred to as a "combination element" and may comprise an illuminated display 103 and a rotary or push part (key 102). The key 102 is used for local operation of the field device 100. The local operation is carried out without aids by means of the hand 110 or the fingers of the operator himself. The shaded area indicates the illuminated area of the illuminated display 103.

In the combination element 101, the illuminated display 103 and the key arrangement 102 are thus merged into a combined element (operating element 101). Both functions "lighting" and "operating" are thus enabled via the common combination element.

FIG. 2b shows a top view of the control element 101 of the field device 100 of FIG. 2a. In this embodiment, the illuminated area (shaded area) is arranged inside the operating element 101. The button 102, here without an illuminated function in the form of a ring, is arranged in the outer area around the illuminated display 103. Here, too, the hatched area shows the illuminated area.

FIG. 2c shows a further embodiment of a control element 101 in plan view. In this embodiment, the illuminated surface is arranged in the outer region of the operating element. The key 102 is combined with the illuminated display and is arranged in a ring shape in the outer region of the operating element 101. Again, the shaded area indicates the illuminated area. The inner, circular area of the combination element does not have any luminous or operating functions.

The field devices described above and below can be used in the field of process and factory automation, for example, to measure levels, pressures, temperature, densities or flow rates. Also, the field devices can be actuators, for example in the form of positioners or valves, which can be equipped with various interfaces (e.g., 4 . . . 20 mA, Hart, IO-Link, FF, Profibus PA, two-wire Ethernet (APL . . . ) and which are equipped with a light feedback device (indicator light 103) in combination with a button 102 as one unit on the field device. The combined operating element 101 is attached to the outside of the field device, integrated or pluggable as a module, and can have different shapes and geometries, in particular annular or angular. The local operation, light feedback, possibly also vibration feedback, are completely integrated in the combined element. It can be provided that the operation and the visualization itself can also be carried out from the outside with the field device cover or housing in place, even without aids such as magnetic pins.

The control element can be set up to implement the following four functions:

A.)
Button with light signal on a field device that lights up when pressed or operated on site. The light signals feedback that the press or input has taken place. Alternatively, or together with the lighting, there may also be a vibration or other feedback of the input process.

B.)
A mechanically (e.g., rotatable, pressable, . . . ) movable control panel, which can have geometrically different shapes (e.g., ring-shaped, angular, . . . ). Additional aids for operation are not necessary. The illuminated display is not mandatory.

C.)
A control panel with a luminous body that can have geometrically different shapes (e.g., ring-shaped, angular, . . . ). The illumination of the luminous body can follow the hand or finger operation. Mechanical, capacitive or optical sensors can be provided for this purpose. Additional aids for operation are not necessary.

D.)
In particular, the control element can be of modular design for retrofitting. The illumination by the illuminated display can follow the hand or finger operation. Modular, pluggable concepts such as "Plicscom" or "Plics LED" are possible for retrofitting. Plicscom and Plics LED are pluggable modules for sensors of the Plics device family. Here, the processor logic is outsourced.

In particular, operation, light feedback and possibly also vibration feedback can be integrated in the operating element. The operating element can be attached to the outside of the sensor head as a rotatable light ring (LED ring). For example, a left rotation of the ring corresponds to the command "field, input step or number back", a right rotation of the ring corresponds to the command "field, input step or number forward", a pressure on the top of the ring corresponds to the command "confirm input" and a pressure on the bottom of the ring corresponds to the command "cancel input".

All these input commands described above and below can be acknowledged by colored luminous signs, if desired.

It can also be provided that a pressure on the right side of the ring corresponds to a confirmation of the input (i.e., the "okay" key). A pressure on the left side of the ring can correspond to an abort of the input (key "esc"). A pressure on the whole ring can correspond to the confirmation of the input. Pressing the ring for a longer time (e.g., holding it down for two seconds) can correspond to opening/exiting the parameterization menu.

The mechanically rotatable illuminated ring may have fixed detent steps in which it can be rotated. In particular, it can have a combination function: LED ring and local operating tool.

The operating element can be equipped with capacitive, optical and/or other sensors. With these contactless sensors, the field device can be operated through a field device cover. In particular, operation via gesture recognition can be performed in this case.

Thus, a hand or finger gesture to the left can correspond to the command "Field, input step or number back", a hand or finger gesture to the right can correspond to the command "Field, input step or number forward", a hand or finger gesture in the form of a pressure centrally on the combination element or the field device lid can correspond to the command "Open" and a hand or finger gesture by a pressure centrally for e.g., two seconds on the combination element or the field device lid can correspond to the command "Open". the field device lid corresponds to the command "Confirm input", and a hand or finger gesture by pressing centrally for e.g., two seconds on the combination element or the field device lid corresponds to the command "Open/exit parameterization menu or cancel input".

Alternatively or additionally, the following gesture control functionalities can be implemented: Capacitive by rotating the finger, optical by rotating the finger or other non-electrically connected solutions (gesture control).

As already mentioned, the operating element can be mounted directly above the field device electronics cup and, if capacitive or optical sensors are provided, also below a transparent lid (field device lid), so that operation of the field device is possible from the outside. Since the field device lid can be designed as a transparent lid (for example, light-colored plastic or glass), the illuminated display can be detected through the lid.

The illumination surfaces can be attached to the control element 101 in different ways. For example, inside the lighting element (surface) or outside the ring in the form of a ring light.

The operating element creates extended possibilities for operation by means of the local illuminated display. In particular, more convenient on-site operation and visualization is provided at the field device. The combination of on-site operation and on-site signaling reduces components and has a positive effect on the overall appearance of the field device. By means of the illuminated display in the operating area, operation can be more intuitive. In particular, the operating element can be used reliably even in bad weather (rain, snow, . . . ) since it is not necessary to read the writing in a display or the designation of a button. The use of the operating element also offers considerable advantages in hazardous areas, especially for Ex-d field devices (flame-proof enclosure). The "fire permit", which is costly to obtain for the Ex area, as a permit, can be omitted. In particular, the field device cover does not have to be removed for operation. Susceptible and cost-intensive key arrangements, usually three to four keys per field device, can be omitted. Further operating accessories, such as magnetic pins, screwdrivers, etc., are not required. In particular, it can be provided that the illuminated display is divided into individual segments which are activated depending on the operation and, for example, the segment which can also be pressed is then always illuminated (guide by light).

FIG. 3*a* shows a field device with an operating element 101, which comprises a luminous display 103 and a rotary and push part 102, which is used for local operation of the field device. The operating element 101 is mechanically rotatable. The on-site operation is performed without auxiliary means by means of the hand or fingers of the operator himself. The hatched area indicates the illuminated area.

FIG. 3*b* shows a top view of the rotatable and pressable operating element 101. In this embodiment, the illuminated surface is arranged in a ring shape in the outer area of the operating element 101. The button 102, which also has the shape of a ring, is also arranged in the outer area. The ring can be rotated mechanically, in the form of a grid. The number of grids can be different. In this embodiment, pressing the ring is also possible to perform another operating function (e.g., corresponding to the "okay" or "esc" keys). The shaded area indicates the illuminated area of the illuminated display 103, which is divided into four segments 104, 105, 106, 107.

FIG. 4*a* shows a further field device in which the on-site operation is carried out without aids by means of the hand or finger of the operator himself. The coupling between the operating hand 110 and the integrated control panel of the control element 101 takes place, for example, capacitively 114. Capacitive sensor technology is provided in the control element 101 for this purpose. This makes gesture control possible. This allows direct operation as usual without field unit lid 112 as well as operation with field unit lid 112, under which the operating element 101 is located. The upper area 111 of the field device lid can be transparent. 113 shows the field device itself, for example here a radar level meter.

FIG. 4*b* shows a top view of the operating element 101 of the field device of FIG. 4*a*. In this embodiment, the operating surface 101 is located in the central area of the operating element 101. The ring-shaped illuminated display 103 is arranged around it. The outer ring represents the field device cover 112.

Figure 5A:
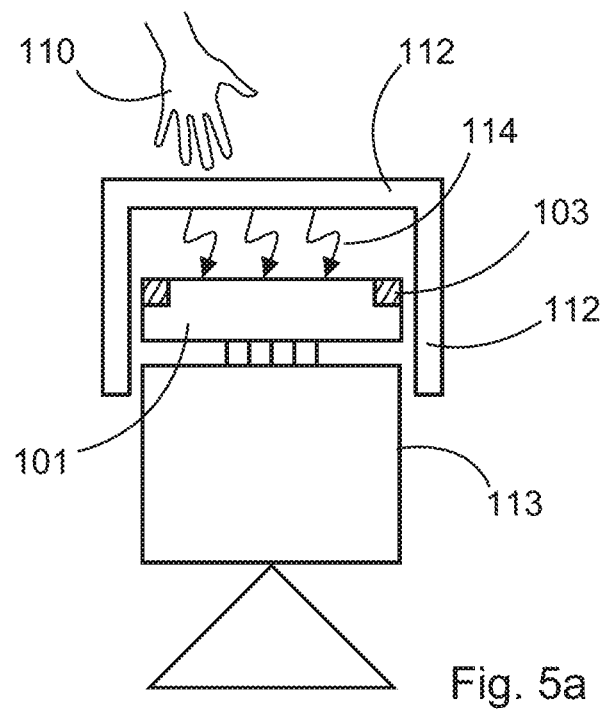
FIG. 5a shows another embodiment of a field device.

FIG. 5*a* shows an embodiment of a further field device that corresponds in many respects to the embodiment of FIG. 4*a*. In this embodiment, the button has optical sensing 114, as an alternative to or in addition to the capacitive sensing of the embodiment of FIG. 4*a*.

Figure 5B:
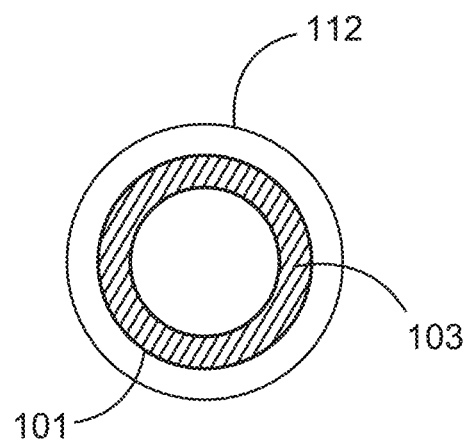

FIG. 5*b* shows that the arrangement of the button and the indicator light 103 may be provided in the same manner as in the embodiment of FIG. 4*a*.

Figure 6:
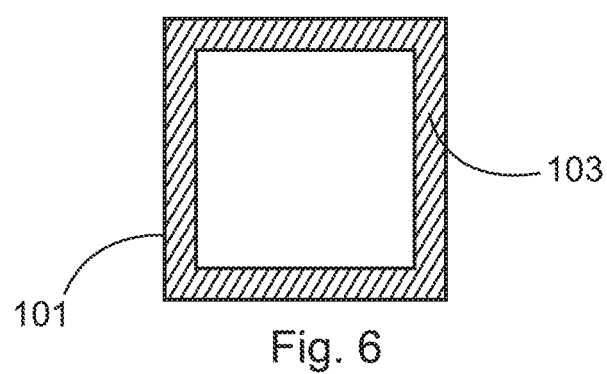
FIG. 6 shows a top view of another control element.

FIG. 6 shows a control element 101 that is not ring-shaped, but here, for example, has an angular design. In this embodiment, the illuminated surface of the illuminated display 103 is also arranged in an angular shape in the outer area of the operating element 101. The hatched area also indicates the illuminated area here.

Additionally, it should be noted that "comprising" and "having" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A level meter configured for process automation in industrial or private environments, comprising:
a housing with a lid;
level meter electronics arranged inside the housing;
operating circuitry configured to operate the level meter, which has a button and a luminous display,
wherein the luminous display is configured to provide visual feedback of an operation command issued by a user to the button,
wherein the operating circuitry is a module that is mounted above the level meter electronics and arranged inside the housing, and
wherein the lid closes the housing and covers the operating circuitry.

2. The level meter according to claim 1,
wherein the button is configured to be pressable, rotatable and/or laterally displaceable in order to convert an operating command delivered by the user to the button into a corresponding operating signal.

3. The level meter according to claim 1,
wherein the button includes capacitive or magnetic sensors for converting an operation command delivered to the button by the user into a corresponding operation signal.

4. The level meter according to claim 1,
wherein the button is annular in shape.

5. The level meter according to claim 1,
wherein the luminous display is annular or circular in shape.

6. The level meter according to claim 5,
wherein the button is arranged in a ring around the luminous display.

7. The level meter according to claim 1,
where the luminous display is integrated into the button.

8. The level meter according to claim 1,
wherein the button is divided into a plurality of segments.

9. The level meter according to claim 1,
wherein the level meter has no further operating element.

10. The level meter according to claim 1,
wherein the level meter is a level sensor, a point level sensor, a flow meter, or a microwave barrier.

11. The level meter according to claim 1, further comprising:
a level meter cover attached to a housing of the level meter and covering the operating circuitry.

12. The level meter according to claim 10,
wherein the level sensor is a level radar sensor.

13. The level meter according to claim 10,
wherein the microwave barrier is a reflection microwave barrier.

14. The level meter according to claim 2,
wherein the button includes capacitive or magnetic sensors for converting an operation command delivered to the button by the user into a corresponding operation signal.

15. The level meter according to claim 2,
wherein the button is annular in shape.

16. The level meter according to claim 3,
wherein the button is annular in shape.

17. The level meter according to claim 2,
wherein the luminous display is annular or circular in shape.

18. The level meter according to claim 3,
wherein the luminous display is annular or circular in shape.

19. The level meter according to claim 4,
wherein the luminous display is annular or circular in shape.

\* \* \* \* \*